United States Patent Office 2,856,707
Patented Oct. 21, 1958

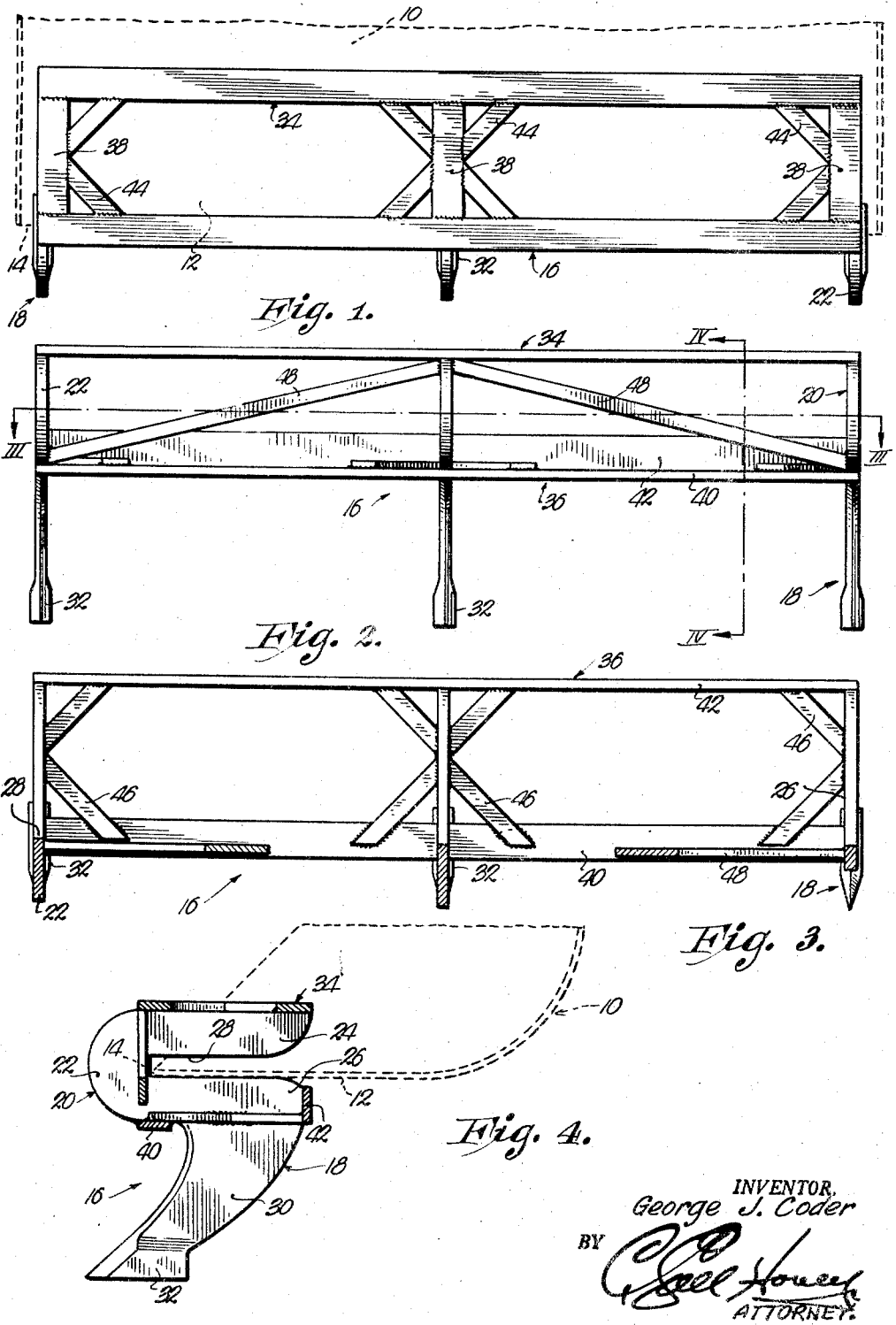

2,856,707

SCARIFIER FOR EARTH HANDLING SHOVELS

George J. Coder, Kansas City, Mo.

Application May 28, 1954, Serial No. 433,090

1 Claim. (Cl. 37—142)

This invention relates to earth handling and moving equipment and particularly to an attachment for shovels, buckets and the like of such equipment capable of adapting the latter for use as a digging tool or scarifying machine, the primary object being to improve upon prior attachments of this character by eliminating time-consuming, expensive and otherwise objectionable fastening means normally employed to secure the attachment to the bucket or shovel.

It is the most important object of the instant invention to provide a scarifier attachment having in addition to the plurality of digging teeth normally used for scarifying purposes, slots for receiving the shovel and thereby mounting the entire attachment upon the shovel without need of bolts, brackets, clamps and other fasteners.

Another important object of the instant invention is the provision of a scarifier that may be attached to the shovel and removed therefrom simply by moving the shovel into a properly aligned position with respect to the attachment and thereupon extending the shovel into interlocking relationship with the aforementioned slots of the scarifier.

Additional objects include the way in which the attachment is provided with a plurality of S-shaped elements which present the shanks and teeth, as well as the shovel receiving slots above-mentioned; the way in which the sole means for mounting the attachment on the shovel consists of U-shaped members integral with the shank of the teeth; the manner of interconnecting the elements or members by framework joining the legs of the U-shaped members; and many additional objects including details of construction to be made clear as the following specification progresses.

In the drawing:

Figure 1 is a top plan view of a scarifier made pursuant to the present invention showing the same operably mounted upon a shovel of an earth handling machine.

Fig. 2 is a front elevational view thereof.

Fig. 3 is a longitudinal, cross-sectional view taken on line III—III of Fig. 2; and Fig. 4 is a transverse, cross-sectional view on a reduced scale taken on line IV—IV of Fig. 2 and showing the manner of mounting the attachment on a shovel.

Those skilled in this field are familiar with the various types of buckets, shovels and the like that are commonly employed in earth handling equipment. One form of such earth-receiving bucket or shovel is shown in Figs. 1 and 4 of the drawing to illustrate the principles of the instant invention and such shovel is broadly designated by the numeral 10. Noteworthy is the fact that shovel 10 is open at the front thereof and has a bottom wall 12 terminating normally in a straight, horizontal, forwardmost edge 14.

The attachment of the present invention broadly designated by the numeral 16, is adapted for quick and easy mounting and detachment when used with shovels of such character or similar earth-handling equipment and includes a plurality of substantially S-shaped elements 18 of identical character. Each element 18 is provided with a U-shaped member 20 having a bight 22 and a pair of rearwardly-extending legs 24 and 26 spaced to present a rearwardly-facing shovel receiving slot 28. The lowermost leg 26 has a forwardly-projecting shank 30 depending therefrom and formed integrally therewith. Each shank 30 in turn is provided with a tooth 32 appropriately shaped through use of beveled and sloping surfaces to attain the best advantages when placed in use in the manner hereinafter to be fully set forth.

The series of elements 18 may be interconnected in any suitable manner, but since the attachment must be designed to withstand relatively great forces applied thereto under normal use, it is desirable to join the members 20 by a pair of frames 34 and 36. The upper frame 34 is polygonal as shown in Fig. 1 and the crossbars 38 thereof lie flatly upon the legs 24 throughout the lengths of the latter and are joined rigidly thereto by welding or other suitable means of attachment.

The lower frame 36 interconnects the legs 26 of the members 20 and includes a tie bar 40 underlying the legs 26 forwardly of the shanks 30 and a second tie bar 42 abutting the rearmost ends of the legs 26 above the shanks 30 as seen in Fig. 4. The tie bars 40 and 42 may also be rigidly connected to the legs 26 by welding or the like.

Gusset braces 44 serve to strengthen the frame 34 and gusset braces 46 provide additional strength by interconnecting the legs 26 with the tie bars 40 and 42. Still further strengthening means may be included by providing diagonal braces 48 between the bights 22 of the members 20.

When the attachment 16 is mounted on the shovel 10 in the manner shown by Figs. 1 and 4 of the drawing, the frame 34 is disposed between the side walls of the shovel 10 in overlying relationship to the bottom wall 12 thereof. It is seen further that the said bottom wall 12 extends into the slots 28 into abutting relationship with the bights 22 and, therefore, as the shovel 10 is moved forwardly, the attachment 16 is held in place without need of any additional fastening means whatsoever. Conversely, when it is desired to place the shovel 10 in use for other purposes, it is but necessary to move the latter rearwardly out of the slots 28, leaving the entire attachment in the ground ready for subsequent use.

The entire attachment has been designed primarily for use in loosening the earth prior to subsequent utilization of the shovel 10 in removing the loosened material. For example, in digging basements, extremely hard soil and rock are often encountered, making it almost impossible to remove the material until loosening takes place. The shanks 30 and teeth 32 will effectively dig the soil loose even to a point adjacent the vertical side walls of the basement or other excavation being dug, and the operator may thereupon quickly and easily back away from the attachment and remove the loosened soil prior to subsequent digging operations through use of the attachment of the instant invention.

It is clear from the very nature of the attachment hereinabove described, that many of the aforementioned details of construction may be varied within the spirit of the invention and it is, therefore, desired to be limited only by the scope of the appended claim.

Having thus described the invention what is claimed as new and desired to be secured by Letters Patent is:

A scarifier adapted to be mounted on an earth moving shovel of the type provided with a straight, horizontal forwardmost edge and a flat bottom wall extending rearwardly therefrom, said scarifier comprising a plurality of spaced, substantially S-shaped, normally vertical planar elements disposed in parallel relationship, each of said elements including a U-shaped portion at the upper end thereof, said portions each being provided with a bight, an elongated lower leg and an elongated upper leg substantially coextensive in length with said lower leg, said upper and lower legs of each of the elements extending rearwardly from respective bights and disposed in horizontally parallel relationship to present aligned slots adapted to receive said bottom of the shovel with said edge thereof engaging the bights of the portions and said upper and lower legs of the portions overlying and underlying respectively, a substantial section of the bottom wall of the shovel, the upper and lower legs of each of the elements being provided with arcuate rearmost ends remote from said bights, presenting flared mouths at the entrances to said slots to thereby assure entry of said bottom wall into the slots irrespective of slight misalignment of the bottom wall with the slots, and the lower end of each of the elements being integral with a corresponding lower leg and each having a forwardly projecting, concave, earth scarifying surface; a pair of parallel, normally horizontal, rectangular, transversely braced frames, one of said frams being welded to the uppermost part of each of the upper legs, respectively, to thereby interconnect the upper legs, and the other frame being welded to substantially the lowermost part of each of said lower legs, respectively, to thereby interconnect the latter.

References Cited in the file of this patent

UNITED STATES PATENTS

| | | |
|---|---|---|
| 993,785 | McCormick | May 30, 1911 |
| 1,285,582 | Bailey | Nov. 26, 1918 |
| 2,284,388 | Gurries | May 26, 1942 |
| 2,491,058 | Peacock et al. | Dec. 13, 1949 |
| 2,642,791 | Peacock | June 23, 1953 |
| 2,705,380 | Hensley | Apr. 5, 1955 |

FOREIGN PATENTS

| | | |
|---|---|---|
| 200,004 | Great Britain | July 5, 1923 |